(12) United States Patent
Rickenbach

(10) Patent No.: US 8,461,514 B1
(45) Date of Patent: Jun. 11, 2013

(54) OPTICAL SPECTRUM MODULATED POSITION SENSOR HAVING A CONTROLLER WITH AT LEAST ONE FIBER OPTIC LINE

(76) Inventor: Robert Rickenbach, Thousand Oaks, CA (US)

( * ) Notice: Subject to any disclaimer, the term of this patent is extended or adjusted under 35 U.S.C. 154(b) by 297 days.

(21) Appl. No.: 12/931,563

(22) Filed: Feb. 3, 2011

(51) Int. Cl.
*G01D 5/34* (2006.01)
(52) U.S. Cl.
USPC .................................. 250/231.13; 250/566
(58) Field of Classification Search
USPC .............. 250/231.13, 231.18, 231.14, 566, 250/568, 227.14, 227.24; 341/8–13
See application file for complete search history.

(56) References Cited

U.S. PATENT DOCUMENTS 4,866,269 A * 9/1989 Wlodarczyk et al. ..... 250/231.18
5,233,405 A * 8/1993 Wildnauer et al. ............ 356/333

\* cited by examiner

*Primary Examiner* — Que T Le
(74) *Attorney, Agent, or Firm* — Sandy Lipkin

(57) ABSTRACT

A high resolution fiber optic position sensor system including a remote sensor head connected by a pair of optical fibers to an electronic controller unit. The sensor is an electronically passive device that utilizes optical signals only that senses the angular absolute position over the full 360° rotation with a sensing resolution of 13 bit (8196). The sensor modulates the optical signal based on the exact position of the sensor disk. This modulated optical signal is analyzed in the controller and translated into the position signal. Because the sensor head is electrically passive it can be deployed in an EMI/RFI intense environment. Further, it is immune to lightening strikes and can also be located many hundred meters away from the control unit without creating undesirable ground loops.

11 Claims, 7 Drawing Sheets

OPTICAL SPECTRUM MODULATED POSITION SENSOR HAVING A CONTROLLER WITH AT LEAST ONE FIBER OPTIC LINE

BACKGROUND OF THE INVENTION

1. Field of the Invention

The present invention relates to a high resolution fiber optic position sensor system. Specifically, the system is comprised of a remote sensor head connected by a pair of optical fibers to an electronic controller unit. The sensor is an electronically passive device that utilizes optical signals only. It senses the angular absolute position over the full 360° rotation with a sensing resolution of 13 bit (8196). The sensor modulates the optical signal based on the exact position of the sensor disk. This modulated optical signal is analyzed in the controller and translated into the position signal. Because the sensor head is electrically passive it can be deployed in an EMI/RFI intense environment. Further, it is immune to lightening strikes and can also be located many hundred meters away from the control unit without creating undesirable ground loops.

The invention disclosed herein is unique in that the position information is embedded in the optical spectrum rather than in the optical amplitude. This is significant because attempts to make use of the optical amplitude (signal strength) are unsuccessful because amplitude levels in optical fibers are unstable and typically vary well beyond 10%. Because the optical spectrum cannot vary and will not vary even when the amplitude changes, the instant invention is highly accurate and insensitive to changes in optical signal variation in the fiber.

2. Description of the Prior Art

The need for accurate position sensing is everywhere. Nearly anywhere mechanical motion is effectuated by means of an automatic system, a sensor to measure position is used. Position sensors are found in applications such as industrial automation, CNC machining, transportation, aviation, shipboard, trains, medical imaging, cranes, wind turbines, radio telescopes and the like.

Position sensor technology is generally regarded to be mature and incremental refinements are being regularly made. The field can be broken down into a few fundamental technologies. These include optical incremental encoders, optical absolute encoders, electromagnetic resolvers (inductive), potentiometers (varying resistance) and magnetic field sensors (Hall effect). All the above listed sensors process an electric current. They need to have an external electric power source or internal battery and typically require the connection of electrical wires to a control unit.

In many applications the electrical connection between sensor and control unit is cause for problems. External electric fields may induce noise in the transmission lines causing erroneous position information or, in the case of lightening, may even destroy the sensor or control unit.

Position sensors are also often used in petro-chemical processing to sense the position of valves, gates covers, baffles etc. In these environments electrical wires may cause sparking and are considered hazardous items.

Thus, the present invention describes a position sensor that measures the position by means of optical light signals only. By eliminating any electrical components, this new sensor becomes immune to any electrical interference whatsoever.

Rotation sensing and linear measurement techniques are numerous and many varying concepts have been invented and used. Described herein are concepts for measuring absolute position. In defining absolute position, one needs a sensor that will report an accurate position at all times, after initial power up and without any mechanical movement present on the sensor. Absolute sensors do not require an initial calibration or homing after the system power has been applied.

Absolute encoders, or position sensors, are ubiquitous everywhere in our daily lives. Described herein are the fields wherein there is a foresseable need for a passive non-electronic position sensor. One example includes chemical and petrochemical processing because of the need to eliminate any electrical arcing.

The instant invention is applicable to the field of transportation, and specifically with regard to electric trains where position sensors may be utilized on the pantographs. Voltage line position sensing can also benefit from the instant invention.

Wind turbines would benefit because the sensor is immune to lightening and atmospheric discharge.

Because the sensor is immune to EMI/RFI (directed energy weapons), there are military applications as well.

Medical deployment within radiation and high magnetic fields such as MRI machines can also benefit. The sensor can be built entirely from non magnetic materials and thus is immune to any external interference and will not disturb any magnetic field.

In shaft position feedback applications for vector drive motors, these are relatively slow turning motors where the magnetic vectors are entirely controlled by an external computer and based upon precise shaft position location. A fiber optic position sensor may be useful because it will not be affected by the high magnetic fields of the motor windings.

In general feedback devices (position sensors) are connected electrically (or lately wirelessly) to a controller a certain distance away from the sensor. They are all plagued by EMI/RFI interference and ground loop issues. Of course, established techniques mitigate these issues but still the problems are a constant and systems integrators deal with them on a daily basis. Some prior art methods are described below.

Optical absolute sensors obtain position information by reading a digital code from a rotating disk. The disk has a number of tracks engraved with a binary code. Optical detectors read the track information and translate it to a position signal. These encoders incorporate the rather complex electronic components in close proximity to the rotating disk. Although very accurate and very high resolution, these encoders tend to be fragile and susceptible to electrical and environmental interferences.

A resolver is by nature an absolute sensor. It is a rotary transformer where the magnitude of the energy through the resolver windings varies sinusoidally with the rotation angle of the shaft. These sensors must be energized by one or two alternating voltage sources and will return position information as an AC signal with varying amplitude and phase. No electronic components need to be present in the sensor and thus it makes these sensors more robust mechanically and against electrical interferences. However, resolvers must be connected by electrical wires to the control unit and interfering signals may disturb or even damage the control unit.

Magnetic Hall effect sensors consist of a semiconductor material whose electrical resistance varies with the strength and orientation of a magnetic field. When a Hall effect sensor is exposed to a magnetic field such as a permanent magnet the magnetic field orientation can be determined based on the resistance of the semiconductor.

A number of patent innovations have attempted to solve the issue with a fiber optic encoder, or position sensor. Numerous inventions have been recorded for an electronic passive position sensor. A few patents take the "brute force" approach by simply stringing a number of optical fibers and read tracks of a binary code disk. This is not a practical solution as a high resolution sensor requires at least 10 bits and thus would require at least 10 optical fibers connecting to the sensor. Because the complexity is very high, the reliability is decreased.

Other methods use orthogonal polarization methods where a rotating disk alters the polarization of the light. This approach is technically complex and requires polarization maintaining fibers (PMF) to be deployed. Even so PMF fibers are susceptible to environmental influence such as temperature and mechanical stress that alter the state of polarization. Ultimately there is only limited accuracy that can be obtained by this scheme.

Methods using WDM (wavelength division multiplexing) come closer to being practically realizable. U.S. Pat. No. 4,849,624 describes such a system. This system fundamentally could be reduced to a practically deployable unit. However, the described encoder lacks simplicity because it utilizes concentric tracks for which each wavelength component must be accurately aligned with said track. As higher resolution is demanded, the dimension of the track becomes increasingly small and the optical focal point must be accordingly small and narrow and positioned accurately. The end result is that the optic system requires incredible precision. It is not feasible to build an encoder in excess of 10 bits that also works reliably.

SUMMARY OF THE INVENTION

The preferred embodiment of the instant invention provides an apparatus for the measurement of absolute position in an electrically passive environment comprising: a sensor head with a rotating shaft; a disc mounted on said rotating shaft having printed thereon a non-repeating binary pattern; a controller connected to said sensor through at least one fiber optic line; an optical power source contained in said controller that sends a light pulse to said sensor head through said at least one fiber optic line wherein information regarding the position of said rotating shaft based on data obtained from said disc is returned to said controller through said at least one fiber optic line and processed through a microprocessor that determines the absolute position of said rotating shaft based on said information gleaned from said disc.

The above embodiment can be further modified by defining that non-repeating binary pattern includes a stream of consecutive bits that are unique and appear only once on said disc.

The above embodiment can be further modified by defining that the said microprocessor reads said bits and finds the position of said sensor head through a lookup table that correlates said bits to absolute position of said rotating shaft.

The above embodiment can be further modified by defining that the light pulse from said controller passes through said at least one fiber optic line to said sensor.

The above embodiment can be further modified by defining that the light pulse, after passing through said at least one fiber optic line is collimated after passing through a collimating lens creating a collimated beam that carries optical power to a diffraction grating element wherein said beam created after passing through said diffraction grating element then is folded by a folding mirror then collected through a focusing lens a focal point that is located on the surface of said disk.

The above embodiment can be further modified by defining that the beam after focusing at said focal point on said disk reads the code on said disc and reflects it back through said focusing lens through said folding mirror, through said diffraction element through said collimated lens back through said at least one fiber optic line into said controller with a unique spectrum created through the reading of said 10-bits on said disc.

The above embodiment can be further modified by defining the spectrum analyzer inside of said controller with a CCD camera converts said unique spectrum into a video signal.

The above embodiment can be further modified by defining that the video signal is amplified by an amplifier wherein each video pixel is converted through an analog to digital converter into a 10-bit digital word that said microprocessor in said controller converts to position on disk based on firmware installed in said microprocessor.

The above embodiment can be further modified by defining that the digital word and relative pattern location on said CCD is subjected to a predetermined algorithm to determine absolute position of said rotating shaft.

The above embodiment can be further modified by defining that the code is displayed on a linear ruler than a circular disc.

The above embodiment can be further modified by defining that the higher resolution and precision is obtained by interpolating pattern position between full bit sequence.

The above embodiment can be further modified by defining that the broadband light source is replaced by a narrowband swept light source and wherein the CCD camera is replaced by a photodetector to convert the time variant spectral pattern into an electrical signal.

BRIEF DESCRIPTION OF THE DRAWINGS

This invention can better be understood by reference to the drawings, provided for exemplary purposes, and in which.

DETAILED DESCRIPTION OF A PREFERRED EMBODIMENT

Figure 1:
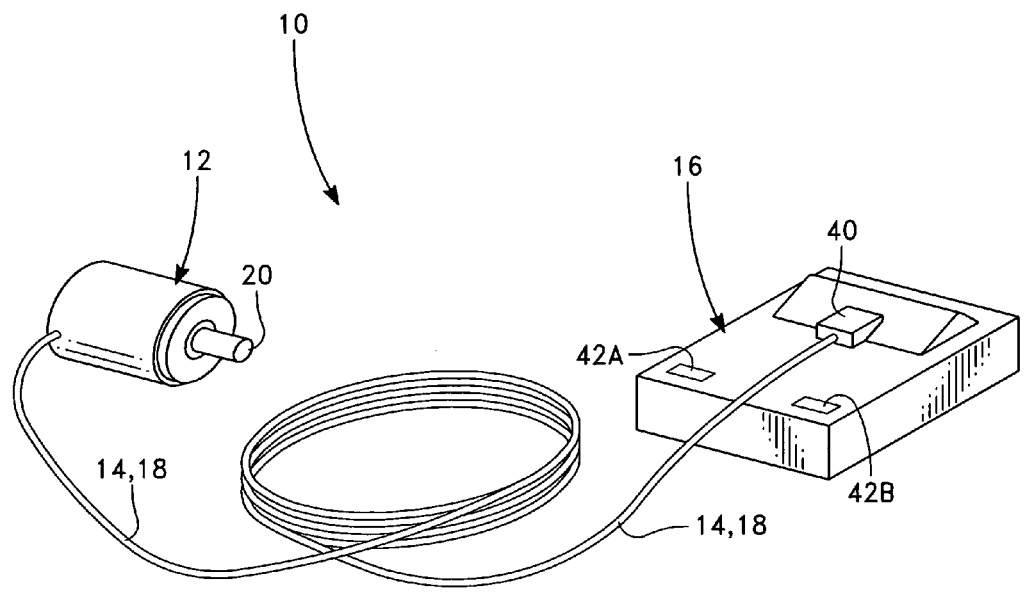
FIG. 1 is a perspective view of the sensor, controller and connecting fiber optics of the instant invention.
Figure 2:
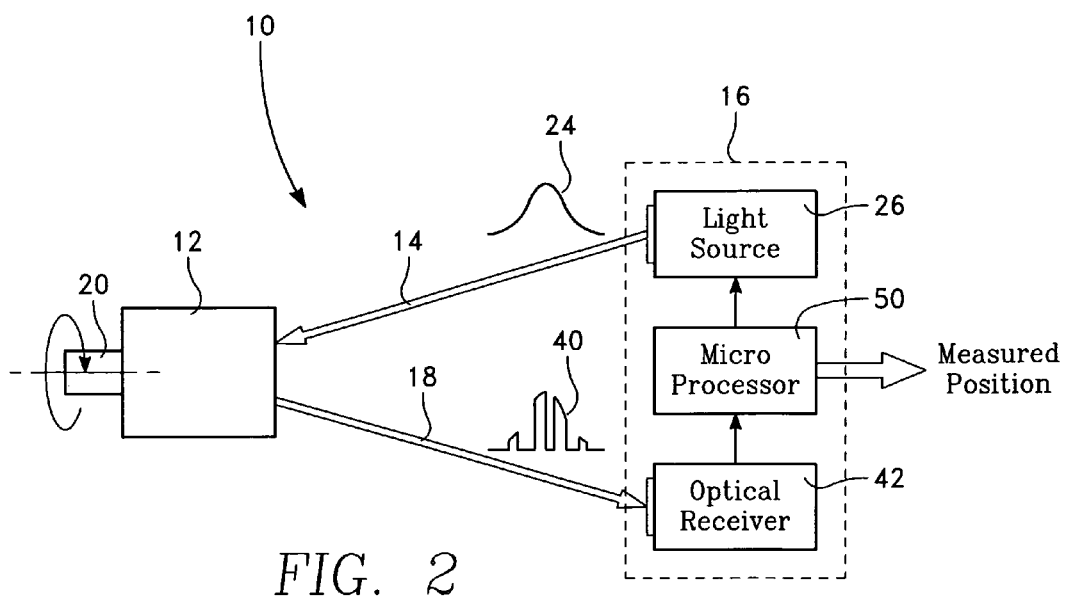
FIG. 2 is a schematic view of the basic concept of the instant invention.

The preferred embodiment of the invention is illustrated in the attached figures. The present invention as generally shown in FIG. 1 is a position measuring system 10 where the sensor head 12 modulates the optical power spectrum that is received via optical fiber 14 from the optical power source at the controller 16. The sensor sends this modulated optical power spectrum back to the controller 16 unit via either the same fiber 14 or via a separate optical fiber 18. The controller unit 16 analyzes this modulated optical power spectrum and determines the angular position of the shaft 20 in the sensor head 12. This process is also shown in FIG. 2 where it is generally shown how the sensor 12 modulates the optical spectrum with position specific information with regard to the shaft 20 of the sensor 12. The controller 16 sends a broadband light pulse 24 from its light source 26 to the sensor 12 through a fiber optic line 14 that sends information back to the controller 16 either through the same line 14 or through another fiber optic line 18 where the spectrum 40 is received at the optical receiver 42 and the information is sent to a microprocessor 50 that then measures the position of the sensor 20. The controller 16 includes a duplex fiber connector 40 and electrical connections 42A, 42B for position output.

The fiber optic link 14, 18 between the sensor 12 and the controller 16 consists of a 62.5/125 µm transmit and receive fiber. The link may be several 100 m in length without affecting the performance of the sensor. The sensor head 12 does not require any electrical power source, nor does it process any electrical signals whatsoever.

Figure 3:
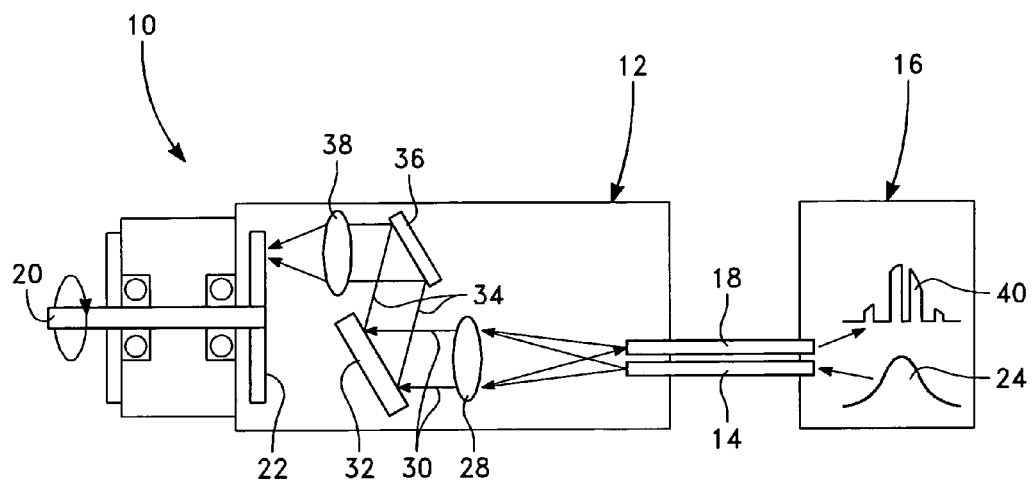
FIG. 3 is a schematic view of the inner workings of the sensor head instant invention.

FIG. 3 illustrates the workings of the sensor system 10. The system 10 consists of three elements: a controller 16, a duplex fiber link 14, 18 and the sensor head 12. The details of the controller 16 are described in FIG. 7. The fiber link 14, 18 contains two graded index multimode fibers of 62.5/125 µm with a numerical aperture of 0.275. It may be as short as a few meters or as long as hundreds of meters. As long as there is enough optical power left for analysis, there is no specific length limit. The sensor head 12 has a rotating shaft 20 on which a code disk 22 is rigidly mounted. The code disk 22 has a non repeating binary pattern imprinted thereon. Each stream of consecutive 10 bits is unique and appears only once around the circumference of the disk. The code also "wraps" around, and thus the position of each code unambiguously defines a specific angular location on the disk.

Figure 4A:
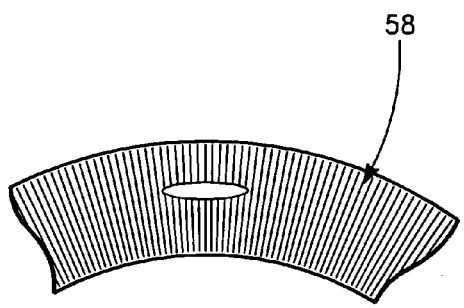
FIG. 4A is a close-up view of a section of the disc containing the unique code.
Figure 4B:
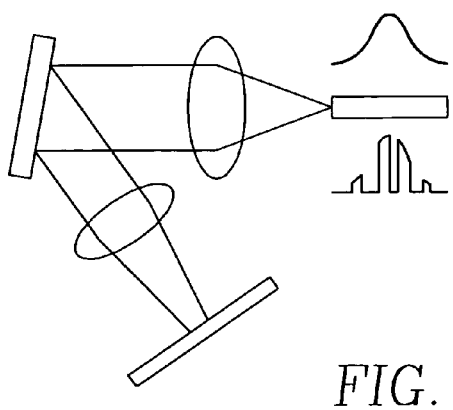
FIG. 4B is a close-up view of the schematics of the linear spectral distribution of light on the sensor disk and how the spectrum has a bit pattern embedded.
Figure 10:
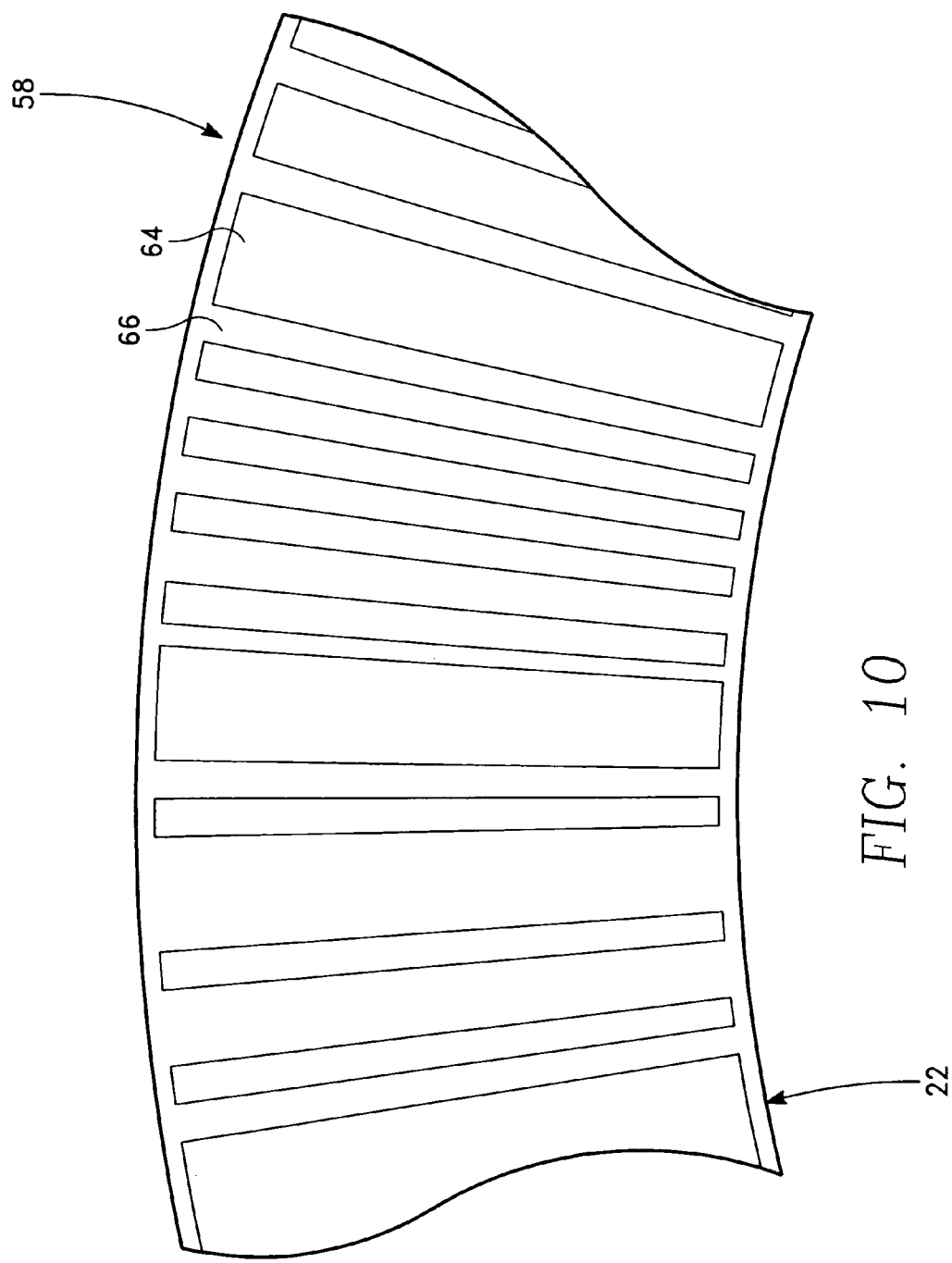
FIG. 10 is a close up view of the bit pattern on the disc taking along the line 10-10 in FIG. 3.

In order to determine the angular position of the disk one needs to read a sequence of at least 10 bits (See FIG. 4A.). The code 58 is imprinted on the code disc 22 and seen in close up in FIG. 10. Then, the angular position can be determined via a look-up table. (See FIGS. 8 and 9.) FIG. 10 shows a sample bit pattern 58 up close. The disc 22 is composed of a glass substrate 64 that is transparent. Imprinted thereon is a reflective metal film 66 arranged in unique patterns for each disc 22. As light is directed toward the disc 22, it is reflected away from positions containing the metal film 66 while it passes through the glass substrate 64 where not metal film 66 is placed.

The system as presented herein makes use of a broad band light source 26 whose spectrum is spread over the distance of at least 10 bits on the code table. The broad band optical spectrum 24 is generated by a light source 26 in the controller unit 16. This light source 26 is coupled into the transmit fiber 14 and collimated in a lens 28. The transmit fiber 14 can be as short as a few meters or it may be several hundred meter long, depending how far away the sensor head 12 needs to be located. The optical power exiting the transmit fiber 14 is collimated in a first collimating lens 28. The collimated beam 30 then carries the optical power to a diffraction grating element 32. The purpose of the diffraction grating element 32 is to cause a spectral dispersion wherein each wavelength is reflected at a slightly different angle. The diffracted light beam 34 is then folded by a folding mirror 36 and collected by a focusing lens 38. The focal point is positioned to be located exactly at the code disk surface 22. The code lines imprinted on the disk are optically reflective and where present will reflect the optical power back through the same path from where it was sent, through lens 38, folding mirror 36, diffraction grating 32, collimating lens 28 and, if the system where so aligned, back into the transmit fiber 14 or through a separate receiving fiber 18. A detailed optical ray tracing shows that this optical system is highly symmetrical and "self focusing". In other words, the reflected optical beam will spatially always be located where the transmit fiber is located. The objective of the design is to collect the reflected light from the code disk into the receive fiber 18. This can be accomplished with a slight misalignment of the focal point in lens 38. The optical power spectrum 40 received via fiber 18 now contains the bit pattern imprint of the code disk at the present angular position of the code disk.

Figure 5:
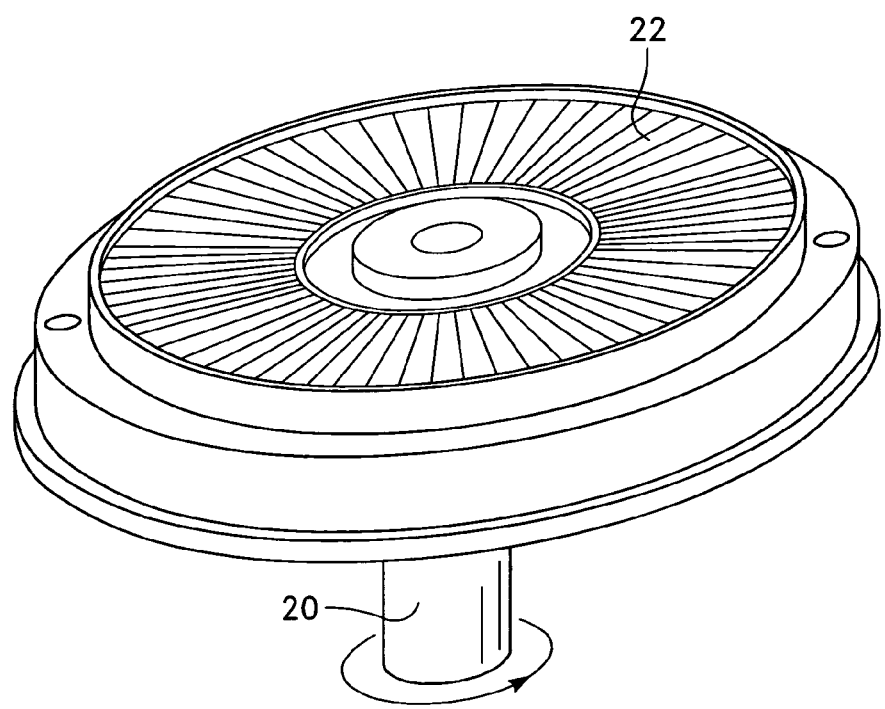
FIG. 5 is a top perspective view of the disk as mounted on the rotating shaft of the sensor head of the instant invention.
Figure 6:
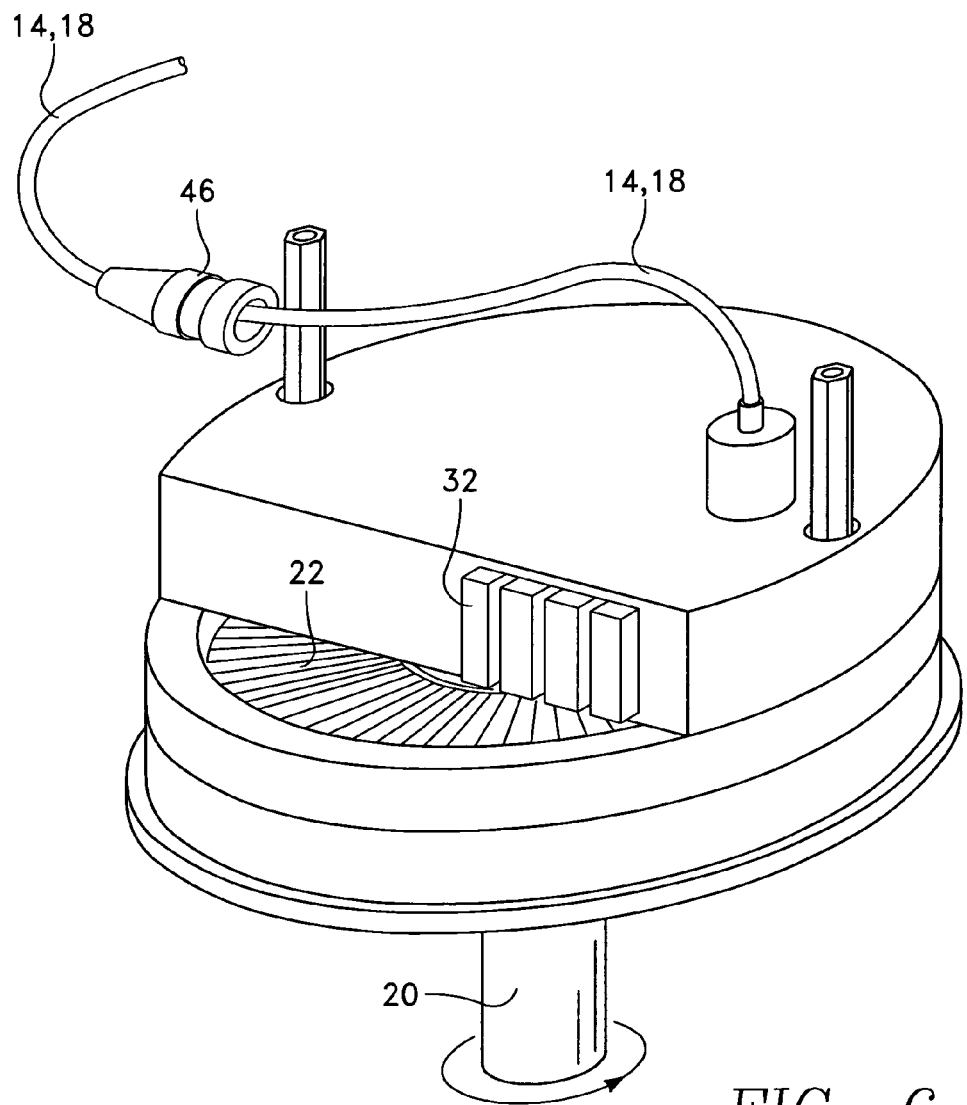
FIG. 6 is a top perspective view of the sensor head of the instant invention

FIGS. 5 and 6 show the device from the outside. FIG. 5 shows the code disk 22 mounted on the rotating shaft 20. FIG. 6 shows the optical head 12 fully assembled wherein the dispersion grating 32 and input and output fibers 14, 18 are visible. The fiber cable 14, 18 connects to strain relief 46 before it enters the system. The input and output fibers 14, 18 are side by side as they enter the system.

Figure 7:
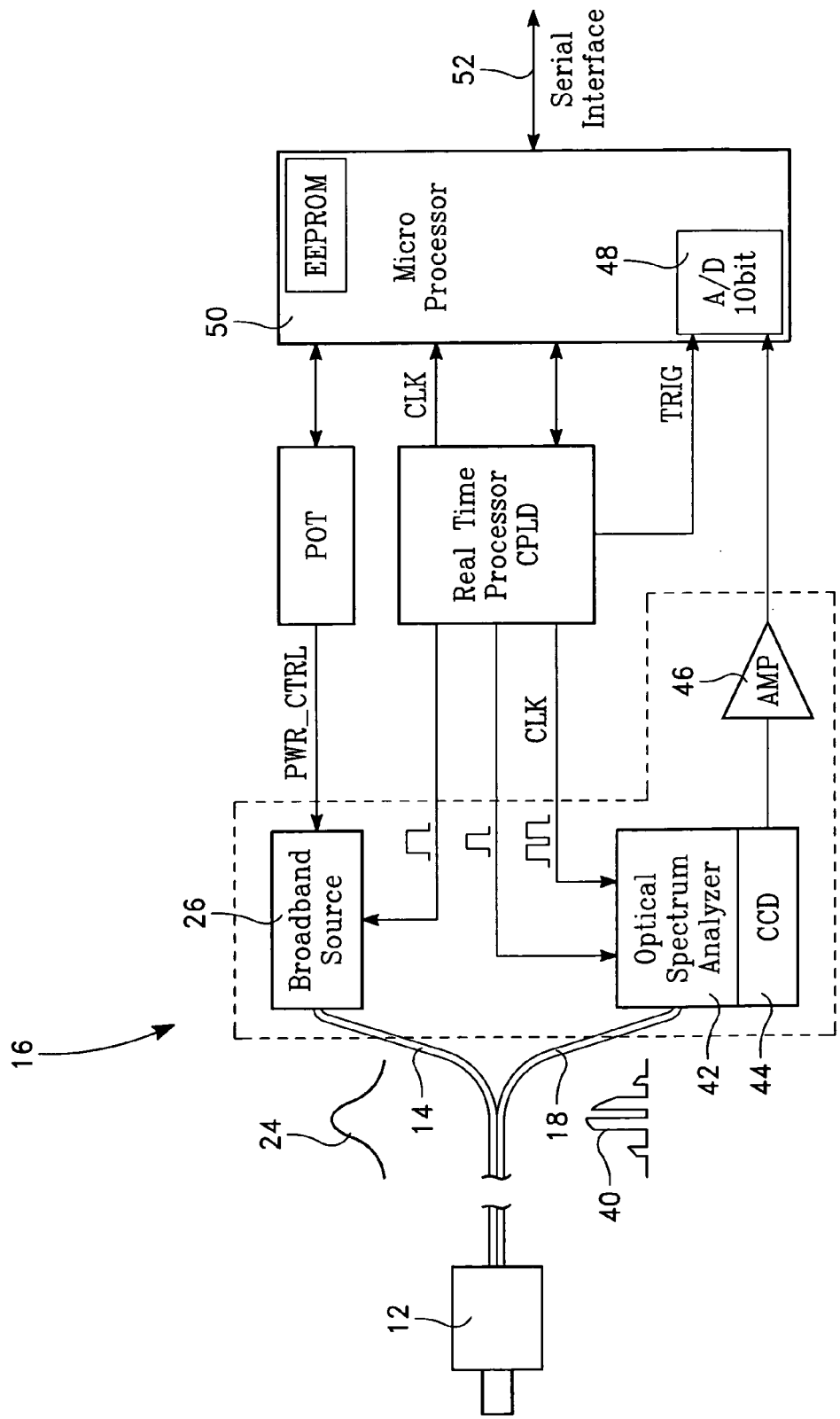
FIG. 7 is a schematic view of the inner workings of the controller of the instant invention.

Referring to FIG. 7, the controller unit 16 contains the broadband optical light source 26. The light source 26 may be of any type and is not particularly critical to the design. The design herein utilizes a common off the shelf 850 nm surface emitting LED emitting at 850 nm and an optical bandwidth of 60 nm. It is important to note that the light source should be pulsed in order to capture the position of the rotating code disk. This pulse is analogous to a camera flash light taking a picture of a fast moving object. If the code disk rotates sufficiently fast, and the light exposure is sufficiently long then code lines will become blurred and no meaningful position could be determined. The individual application will determine how fast the light source needs to be pulsed. The transmit fiber 14 guides the optical pulse from the light source 26 to the sensor head 12 for position interrogation. A second receive fiber 18 returns the modulated optical power spectrum 40 containing the position information in form of a specific unique light pattern.

A traditional optical spectrum analyzer system 42 containing a CCD camera 44 is used to convert the optical spectrum into a corresponding electronic video signal. The video signal is amplified in an amplifier 46 and each video pixel is converted by the analog to digital converter 48 into a 10 bit digital word. The optical power spectrum is then in the form of a data array containing some 250 individual data points. The firmware within the microprocessor 50 analyzes the data. First the 10 bit code on the disk is determined by testing each bit location for a certain amount of signal level. If the signal level is sufficiently high then a corresponding bit is set to logical high. Otherwise, that bit position is a logical 0. Once the bit pattern has been determined the position of the bit pattern is read from the look-up table stored in EEPROM stored in microprocessor 50. The position information is communicated via the serial interface 52.

Based on a 10 bit code one might assume that the maximum position resolution would be $2^{10}$ (1024). The code disk moves continuously with the angular shaft rotation. Therefore the code itself moves continuously and that movement can be used to interpolate the position in between one bit spacing.

Figures 8, 9:
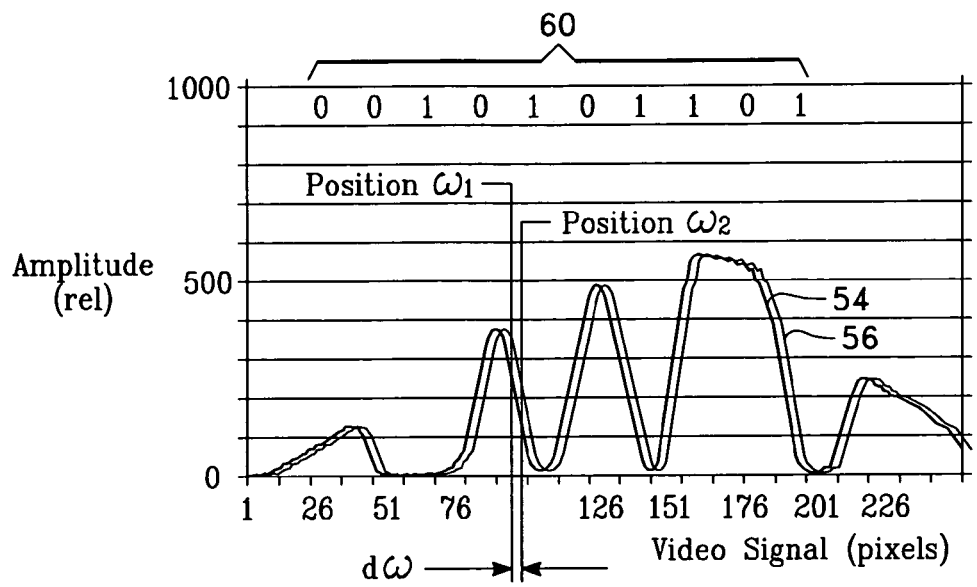
FIG. 8 is a graphical representation of the position as read by the sensor and controller.
FIG. 9 is an example of a lookup table for conversion of the bit information to the position being measured.

In FIG. 8 the video output signal is illustrated. The front trace 54 demonstrates an angular position at $\omega_1$. The bit pattern 60 extracted from the video signal as shown is "0010101101". This equals 173 decimal and corresponds to position 183 in the look-up table where the bit pattern 62 corresponds to position. (See FIG. 9) When the shaft 20 with the code disk 22 is turned, the video signal output will move a proportional amount to position at $\omega_2$ 56. If this movement is small, as shown in FIG. 8, then it will not change the observed bit pattern and the code is still the same at 173 decimal. However, one can clearly discern and measure a change in position as $d\omega$ which is proportional to the change in position. For the video signals shown in FIG. 8 it can be seen that to invoke a change in the bit pattern the code disk must move one full bit position which is the equivalent of 11 video pixels.

The position calculation is:

$$X_1 = (\text{Coarse Position} * 11) + d\omega \rightarrow (183*11) + 0 = 2013$$

$$X_2 = (\text{Coarse Position} * 11) + d\omega \rightarrow (183*11) + 3 = 2016$$

In this example a change of three video pixels results in the change from position 2013 to 2016. The overall resolution of this implementation is 1024 codes positions multiplied by 11 gives a very fine resolution of 11,264 or the equivalent of 0.032°. This effectively demonstrates that the code sequence is not required to be of very high resolution because it is measured as a shift in the pattern's location, whereas large changes result in a change of the bit pattern (coarse position). The firmware within the microprocessor performs all of the necessary calculations as shown above.

The 10 bit code used in this invention requires that the optical signal covers a minimum of 10 bits. The optical beam is positioned at approximately 17 mm radial distance from the center of the disk and thus 10 bits covers a segment of approximately 1.5 mm.

The reading of the code pattern applies to either a circular code or a linear code. The light from an optical fiber is being spatially dispersed into its individual color (wavelength) components. This dispersed light is imaged to a disk with a non-repeating code pattern. Binary "1" are represented as mirrors and reflect the light and binary "0" are absorbing or transmissive in nature and will not reflect light. The reflected light consists now of discrete wavelength components corresponding to the binary pattern of the pattern on the disk or linear scale. It is important to note that each distinct color (wavelength) is associated with a fixed location over the code disk 22. The light is present with the color that got reflected and light with the color that was over a transmissive area on the disk is not present. (See also FIG. 10.)

Analyzing the presence or absence of each color (wavelength) allows the binary pattern on the disk 22 to be replicated. If the defined system were a simple optical imaging arrangement, such as is used in photographic cameras, then it would not be necessary to separate the light into the spectral components, i.e., a spatial sensitive detector such as a CCD array (as is used in digital cameras) would suffice. However, when guiding the light within an optical communications fiber the spatial information is completely lost. On the other had the optical fiber will guide the light of all wavelengths equally well (within a defined wavelength band) and will not and cannot alter the spectral distribution of the light.

The light may be guided through long lengths of optical fiber without affecting the spectral distribution. Analyzing the spectral distribution of the light is relatively easily accomplished. A prism diffracts light in a well known manner to those of ordinary skill in the art. More efficient spectral diffraction is achieved using an optical diffraction grating. A diffraction grating is an optical component with a periodic structure that reflects light at different angles depending on the wavelength of the incident light. The direction of these beams depends on the spacing of the grating and the wavelength of the light so that the grating acts as the dispersive element.

For the instant invention, a diffraction grating is used. The arrangement is considered classic in the art. An input light from the optical fiber is collimated. The diffraction grating diffracts the light. The beam is focused on to the binary code disk. The reflected light is guided back the same path via the diffraction grating and then focused onto a second output fiber. Having the light pass through the diffraction grating twice enhances the spectral definition. Once the light arrives at the controller, the spectral components of the light are analyzed and the code pattern is recreated. The light from the sensor with all the reflected wavelength components is collimated and wavelength separated on the diffraction grating. The diffracted light is focused onto a CCD photo detector. The CCD converts the light at each pixel into an electrical voltage. The voltage output from the CCD is analyzed and the pattern of the code disk can be analyzed. The result is the position.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. Those skilled in the art will make modifications to the invention for particular applications of the invention.

What is claimed is:

1. An apparatus for the measurement of absolute position comprising:
    a sensor head with a rotating shaft;
    a disc mounted on said rotating shaft having printed thereon a non-repeating binary code pattern circularly arranged;
    a controller connected to said sensor through at least one fiber optic line;
    an optical power source contained in said controller that sends optical power to said sensor head through said at least one fiber optic line wherein said optical power is being spatially dispersed in its optical spectrum along the binary code pattern wherein information regarding the position of said rotating shaft is imprinted by the binary code pattern into the spectrum of the optical power wherein the spectral components of the light are being re-collected and returned to said controller through said at least one fiber optic line wherein the optical signal is processed in said controller and absolute position is being retrieved from said optical signal.

2. The apparatus as defined in claim 1 wherein said non-repeating binary code pattern includes a stream of consecutive bits that are unique and appear only once, on said disc.

3. The apparatus as defined in claim 2 wherein a microprocessor reads said bits and finds the position of said sensor head through a lookup table that correlates said bits to absolute position of said rotating shaft.

4. The apparatus as defined in claim 1 wherein said optical power, after passing through said at least one fiber optic line is collimated after passing through a collimating lens creating a collimated beam that carries said optical power to a diffraction grating element wherein said beam created after passing through said diffraction grating element then is folded by a folding mirror then collected through a focusing lens a focal point that is located on the surface of said disk.

5. The apparatus as defined in claim 4 wherein said beam after focusing at said focal point on said disk reads the code on said disc and reflects it back through said focusing lens through said folding mirror, through said diffraction element through said collimated lens back through said at least one fiber optic line into said controller with a unique spectrum created through the reading of said binary code on said disc.

6. The apparatus as defined in claim 5 wherein a spectrum analyzer inside of said controller with a CCD camera converts said unique spectrum into a video signal.

7. The apparatus as defined in claim 6 wherein said video signal is amplified by an amplifier wherein each video pixel is converted through an analog to digital converter into a binary code representing a digital number that said microprocessor in said controller converts to position on disk based on firmware installed in said microprocessor.

8. The apparatus as defined in claim 7 wherein said digital word and relative pattern location on said CCD is subjected to a predetermined algorithm to determine absolute position of said rotating shaft.

9. The apparatus as defined in claim 1 wherein said non-repeating binary code pattern is displayed on a linear ruler rather than a circular disc.

10. The apparatus as defined in claim 3 wherein higher resolution and precision is obtained by interpolating pattern position between full bit sequence.

11. The apparatus as defined in claim 6 wherein said broadband light source is replaced by a narrowband swept light source and wherein said CCD camera is replaced by a photodetector to convert the time variant spectral pattern into an electrical signal.

* * * * *